United States Patent
Moussa et al.

(10) Patent No.: US 11,623,562 B2
(45) Date of Patent: Apr. 11, 2023

(54) LIGHT CONTROL APPARATUS AND METHOD

(71) Applicant: Aptiv Technologies Limited, St. Michael (BB)

(72) Inventors: Mhamed Ben Moussa, Auburn Hills, MI (US); Wojciech Krajewski, Sterling Heights, MI (US)

(73) Assignee: APTIV TECHNOLOGIES LIMITED, St. Michael (BB)

( * ) Notice: Subject to any disclaimer, the term of this patent is extended or adjusted under 35 U.S.C. 154(b) by 496 days.

(21) Appl. No.: 16/742,964

(22) Filed: Jan. 15, 2020

(65) Prior Publication Data

US 2021/0213875 A1 Jul. 15, 2021

(51) Int. Cl.
| | |
|---|---|
| *B60Q 3/14* | (2017.01) |
| *B60Q 3/62* | (2017.01) |
| *B60K 37/00* | (2006.01) |
| *F21V 7/22* | (2018.01) |
| *F21V 8/00* | (2006.01) |
| *F21Y 115/10* | (2016.01) |

(52) U.S. Cl.
CPC ............... *B60Q 3/14* (2017.02); *B60K 37/00* (2013.01); *B60Q 3/62* (2017.02); *F21V 7/22* (2013.01); *G02B 6/0073* (2013.01); *B60K 2370/33* (2019.05); *F21Y 2115/10* (2016.08)

(58) Field of Classification Search
CPC . B60Q 3/14; B60Q 3/62; B60K 37/00; B60K 2370/33; F21V 7/22; G02B 6/0073; F21Y 2115/10
USPC ......................................................... 362/489
See application file for complete search history.

(56) References Cited

U.S. PATENT DOCUMENTS

| | | | |
|---|---|---|---|
| 5,590,945 A | 1/1997 | Simms | |
| 6,107,787 A | 8/2000 | Wand | |

(Continued)

FOREIGN PATENT DOCUMENTS

| | | |
|---|---|---|
| CN | 103236484 A | 8/2013 |
| CN | 103594883 A | 2/2014 |

(Continued)

OTHER PUBLICATIONS

Extended European Search Report for EP Application No. 21151724.8, dated Jun. 1, 2021, 7 pages.

(Continued)

*Primary Examiner* — Britt D Hanley
*Assistant Examiner* — Hana S Featherly
(74) *Attorney, Agent, or Firm* — Billion & Armitgae

(57) ABSTRACT

A light control apparatus includes a diffuser plate, a light source, a light pipe, and a light blocker. The diffuser plate includes at least one opening therein. The diffuser plate includes feature located around the opening in the diffuser plate that exposes a portion of the diffuser plate. A light source positioned proximate a second surface of the diffuser plate is optically coupled to a light pipe positioned around a portion of the opening near the second surface of diffuser plate. A light blocker is positioned near a second portion of the at least one feature. The light blocker is positioned between the light source and the second portion of the feature, the light blocker having an opening therein to allow light to pass from the light source to the diffuser plate proximate the second portion of the feature.

10 Claims, 9 Drawing Sheets

(56) References Cited

U.S. PATENT DOCUMENTS

| | | | |
|---|---|---|---|
| 6,663,250 | B1 | 12/2003 | Rada et al. |
| 6,883,926 | B2 | 4/2005 | Wojnarowski |
| 7,525,254 | B2 | 4/2009 | Lys et al. |
| 10,234,691 | B2 | 3/2019 | Bell et al. |
| 2015/0109784 | A1* | 4/2015 | Baschnagel ........ H01R 33/9453 362/253 |
| 2017/0197516 | A1* | 7/2017 | Yamazaki ............... H02J 7/027 |
| 2017/0321853 | A1* | 11/2017 | Chien .................... F21V 14/06 |
| 2020/0373773 | A1* | 11/2020 | Harris .................. H02J 7/0045 |

FOREIGN PATENT DOCUMENTS

| | | |
|---|---|---|
| CN | 207664385 U | 7/2018 |
| CN | 109687215 A | 4/2019 |
| CN | 209658565 U | 11/2019 |
| EP | 2015126 A1 | 1/2009 |
| EP | 2992542 A2 | 3/2016 |
| TW | 201142425 A1 | 12/2011 |
| WO | 2018112309 A1 | 6/2018 |

OTHER PUBLICATIONS

Notice of Decision to Grant Received for CN Application No. 202110054673.5, dated Sep. 28, 2022, 3 Pages.

* cited by examiner

LIGHT CONTROL APPARATUS AND METHOD

FIELD

This disclosure is generally directed to electronic interfaces and more specifically to light control apparatus for illuminating electronic interfaces.

BACKGROUND

Instrument panels in all types of applications are being lit so they are viewable at night. The light intensity must be controlled so that it is high enough to be visible yet low enough to prevent loss of night vision for night operation of a vehicle by a human. Therefore, the light intensity needs to be carefully controlled Electronic interfaces are now becoming common in all types of vehicles. For example, today's vehicles feature USB ports for various electronics. People can power phones, tablet computers, viewers, battery chargers, or any type of device with a USB port. Airplanes now feature USB ports and headphone jacks and 120 V receptacles for each passenger to use while watching movies streamed over WIFI on the airplane. Automobiles now also feature various connectors at various positions inside the car. These features need to be lit so that users can find them in low light conditions.

Device use continues to rise. The result is a need to pack more electronics into a limited space to meet the increased demand for smaller devices. The connection space in an automobile or an airplane or any other vehicle is limited. Therefore, there is a need to pack more connections in the same or even a smaller space. A prime example is the development of the USB-C connector or interface which is smaller than the USB-A connector. These connectors are being more closely spaced which constrains current designs for delivering light to areas near a USB-C connector.

In addition, the solution for delivering light to the connector must be aesthetically appealing in order to convey a feeling of quality in the entire end product.

SUMMARY

According to one aspect, a light control apparatus includes a diffuser plate, a light source, a light pipe, and a light blocker. The diffuser plate includes at least one opening therein. The diffuser plate also includes a first surface having an opaque coating and second surface. The first surface also includes a feature around the opening in the diffuser plate that exposes a portion of the diffuser plate. In other words, the opaque material is removed at the feature around the opening in the diffuser plate. The light source positioned proximate the second surface of the diffuser plate. The light pipe is optically coupled to the light source. The light pipe is positioned around a portion of the opening near the second surface of diffuser plate. The light pipe delivers light to the diffuser plate around a first portion of the at least one feature. The light blocker is positioned near a second portion of the at least one feature. The light blocker is positioned between the light source and the second portion of the feature, the light blocker having an opening therein to allow light to pass from the light source to the diffuser plate proximate the second portion of the feature, the opening being smaller than the light blocker.

According to another aspect, a method of lighting a feature associated with a diffuser plate includes optically coupling a light source to a light pipe positioned around a first portion of the feature. The method further includes blocking a majority of direct light from the light source from being directed toward a second portion of the feature with a light block positioned between the light source and the feature, and allowing a portion of the direct light from the light source to be directed through an opening in the light block towards the second portion of the feature. Light from the light pipe lights a first portion of the feature.

DETAILED DESCRIPTION

Figure 1:
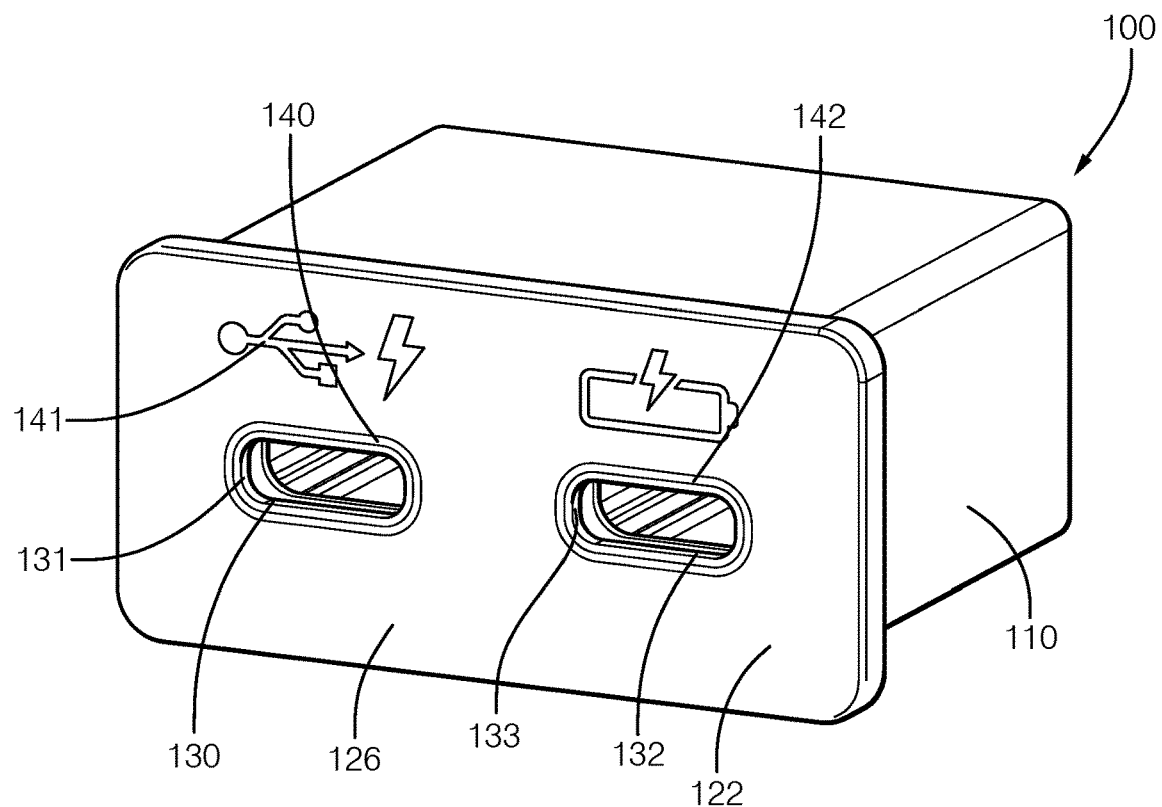
FIG. 1 is a front isometric view of a dashboard component that includes a light control apparatus, according to some embodiments.

FIG. 1 is front isometric view of a housing 100 for a dashboard component that includes a light control apparatus 300 (shown in FIG. 3), according to some embodiments. The housing 100 includes a main body 110. The main body 110 includes features for attaching the housing 100 to an instrument panel, such as the dashboard of an automobile. Attached to the main body 110 is a diffuser plate 120. The diffuser plate has a first surface or side 122 which is external with respect to the housing 100. The diffuser plate 120 also has a second surface or side 124 (shown in FIG. 3) which, when attached to the housing 100, forms an internal surface not generally viewable when looking at a dashboard. The diffuser plate 120 includes at least one opening 130, therein. In FIG. 1 there are two openings 130, 132. The openings are sized to accept an electrical connector. These can be sized for any type of electrical connector that may be used. In this particular example, the openings 130, 132 are sized to receive USB-C electrical connectors. The diffuser plate surface 122 is covered with an opaque material 126, such as paint or the like. The inner portion of the openings, 131 and 133, can also be covered with an opaque material. A halo 140 circumscribes the opening 130. Another halo 142 circumscribes the opening 132. The halos 140, 142 are formed by removing a portion of the opaque material 126 to expose the diffuser plate 120. Light in the diffuser plate 120 illuminate the halos 140, 142. In one embodiment, the opaque material is removed by laser etching the opaque material 126 to expose a halo-shaped portion of the diffuser plate surface 122. This illuminates the halo so that a user can find the opening 130, 132 in low light conditions. The opaque covering may also be provided with other images 141. The images 141 shown in FIG. 1 relate to the function of the opening. In other words, it indicates which type of electrical conductor can be used.

Figure 2:
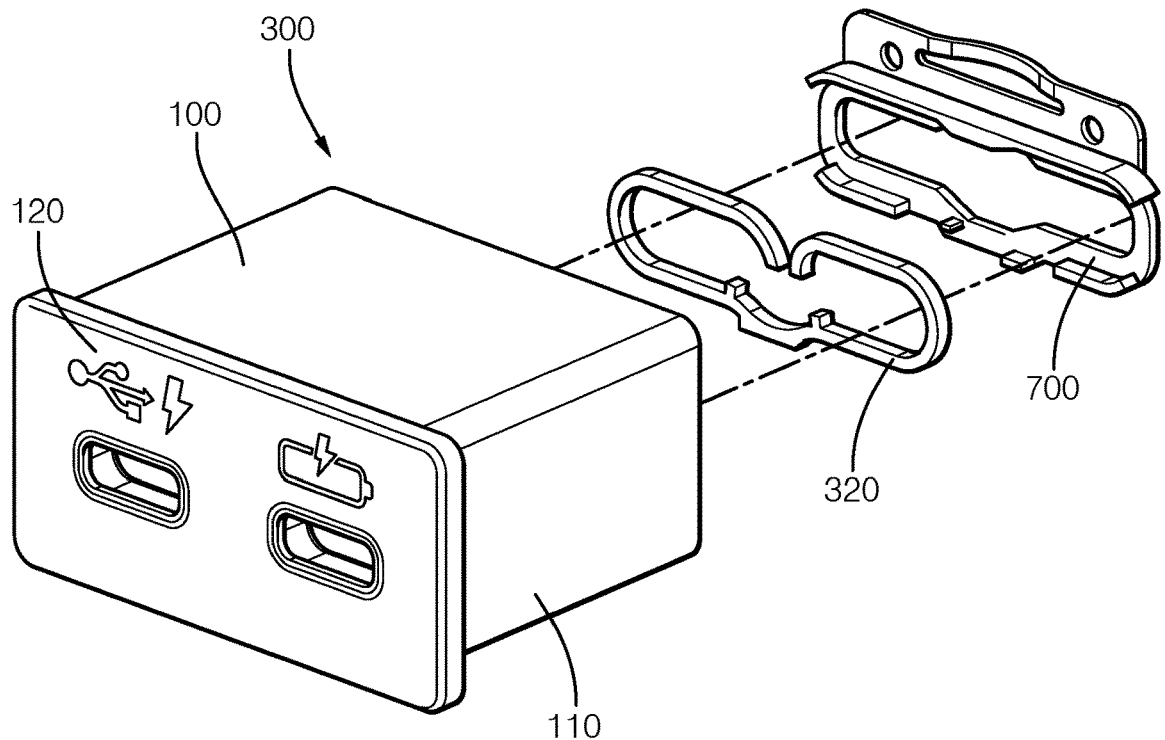
FIG. 2 is an exploded isometric view showing some of the components of the light control apparatus, according to some embodiments.

FIG. 2 is an exploded isometric view of the housing 100 showing some of the components of the light control apparatus 300, according to some embodiments. The housing 100 includes the main body 110 and attached diffuser plate 120. The first diffuser plate surface 122 is shown. Also shown is a light pipe 320 and a reflector 700. The light pipe 320 carries and delivers light to the second surface 124 of the diffuser plate 120. The reflector 700 is positioned near the light pipe 320 and reflects light back to the second surface 124 that would normally travel inside the main body 110 of the housing 100. The housing 100 and the main body 110 is made of an opaque material to contain any stray light.

Figure 3:
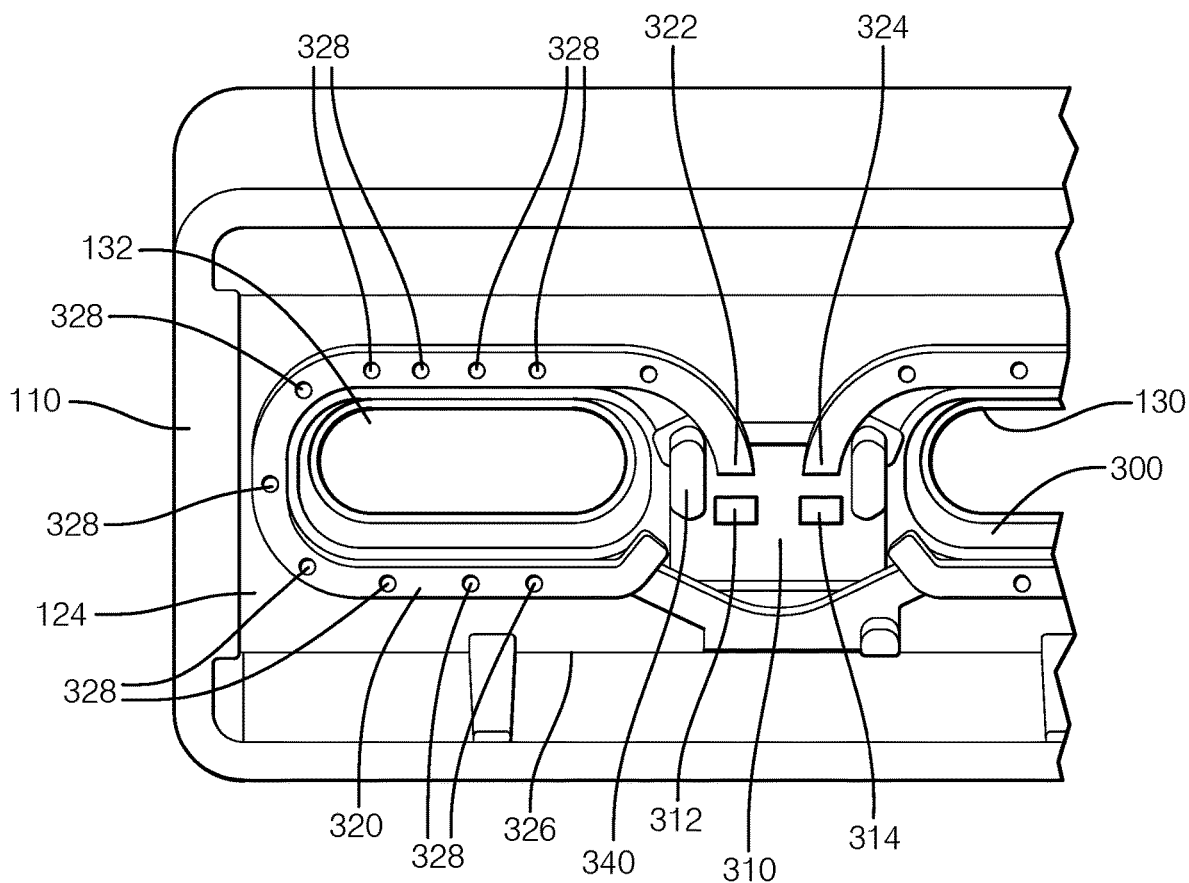
FIG. 3 is a rear view of the light control apparatus, according to some embodiments.

FIG. 3 is a backside view of the light control apparatus 300, according to some embodiments. FIG. 3 shows the specific arrangement of the various components of the light control apparatus 300, including the light pipe 320. The view shown in FIG. 3 is without the reflector 330 so that the structure below the reflector can be shown and discussed in more detail. Now looking more closely at FIG. 3, the second side or second surface 124 of the diffuser plate 120 is shown attached to the main body 110 of the housing. The light pipe 320, which is part of the light control apparatus 300, is attached to the light diffuser plate 120. The light pipe 320 is shaped so that it circumscribes a first portion of the opening 132 and a first portion of the opening 134 in the diffuser plate 120. The light control apparatus also includes a light source 310 which is optically coupled to the light pipe 320 at a first light input 322 and a second light input 324. The light pipe 320 is shaped so that it extends to the light source 310. As shown, the light source 310 includes a first LED 312 and a second LED 314. The LEDs 312, 314 are monochromatic in some embodiments and multichromatic in other embodiments. Generally, both of the LEDs 312 and 314 are substantially identical with respect to the light they output. The light source 310 is positioned proximate the second surface 124 of the diffuser plate 120. The LEDs 312, 314 are positioned proximate a first light input 322 and a second light input 324, respectively. The LEDs 312, 314 are positioned so that they are optically coupled to the first light input 322 and the second light input 324. Although LEDs are shown here, it is contemplated that another type of light source could be used.

The arrangement of the light control apparatus 300 is symmetrical. So, rather than describe both sides, the discussion will now be directed to one opening 130 for the sake of simplicity. The light pipe 320 includes a spur 326 that carries light to an end of the first portion of the opening 130. The light pipe 320 also includes a plurality of facets 328 that direct that allow the light to exit the light pipe 320. The size of each facet 328 is varied to allow more or less light to pass out from a particular facet 328. As light travels down the light pipe, the amount of light within the pipe diminishes as light is let out of facets along the light pipe 320. Therefore, the facets 328 nearing the end of the light pipe 320 may be larger so that a similar amount of light may be output proximate the end of the light pipe 320 as at another smaller facet closer to the light source.

The objective of the light control apparatus 300 is to distribute light around the openings 130, 132 so there are no bright spots. Thus, light from the light pipe 320 is controllably released around a first portion of the opening 130, 132. Stray light from the light source 310 would cause a bright spot near the second portion of the opening 132. The second portion of the opening 132 is nearest the light source 310 and nearest LED 312. In order to control stray light from making the second portion of the opening too bright or brighter than the first portion which is lit by the light pipe 320, a light blocking rib 340 is placed between the light source 310 and the second portion of the opening 132. This prevents a condition where stray light from LED 312 would brighten the second portion of the opening brighter than the first portion of the opening 132.

As can be seen, the space constraints prevent the light pipe 320 or the spur 326 of the light pipe 320 from being positioned near the second portion of the opening 132. The second portions of the opening is near the LED 312. The light blocking rib 340 has an aperture 342 (shown in FIG. 4) therein which provides a light path from the light source 310 to the second portion of the opening 132. The aperture 342 can be a tunnel having any type of cross-sectional shape. The size of the aperture 342 in the light blocking rib 340 is varied to control the amount of light delivered to the second portion of the opening 132. The size of the aperture 342 also controls the intensity or brightness of the light at the second portion of the opening 132. In some embodiments, the aperture 342 or light path includes diffuser material 129 (shown in FIG. 4). This will also affect the brightness somewhat at the second portion of the opening 132. In some embodiments the amount of diffusing material in the aperture 342 in the light blocking rib 340 is less than the entire volume of the aperture 342. The diffuser material 129 in the aperture 342 in some embodiments, will be substantially the same as the diffuser material 129 of the diffuser plate 120.

Figure 4:
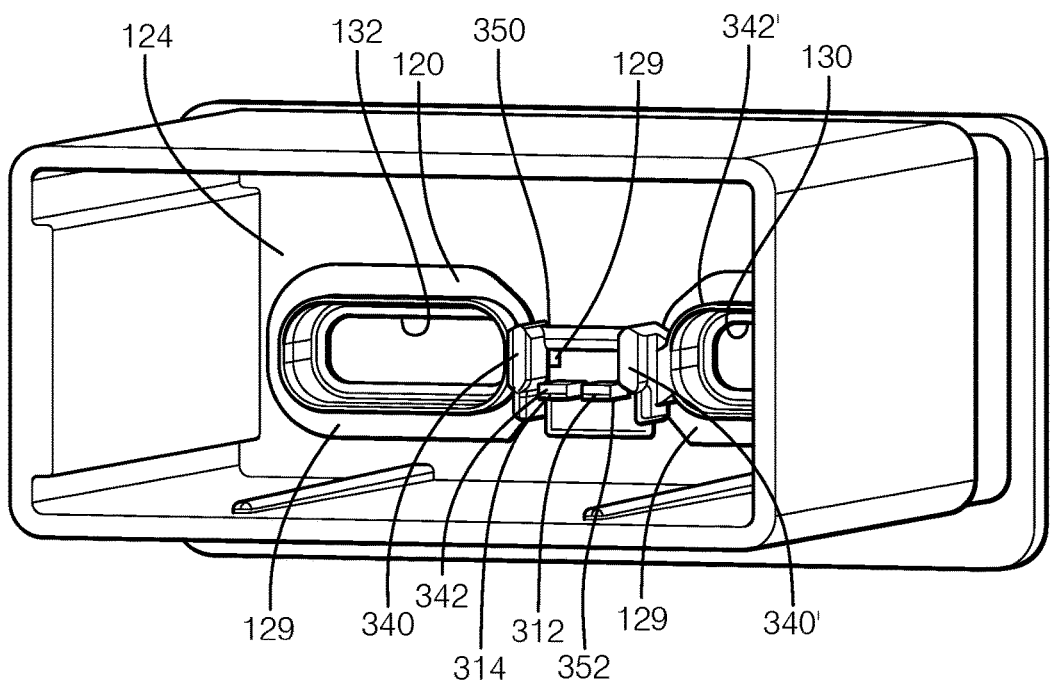
FIG. 4 is a rear isometric view of the light control apparatus illustrating an aperture formed within the light blocker according to some embodiments.

FIG. 4 is a rear isometric view of the light control apparatus 300 with the light pipe 320 removed, illustrating the light blocking ribs 340, 340' and the apertures 342, 342' formed within the light blocking ribs 340, 340' according to some embodiments. The light pipe 320 is removed so the arrangement can be seen more clearly. The isometric view shows the second surface or side 124 of the diffuser plate 120. The diffuser material 129 is positioned around the opening 132, 130 in the diffuser plate 120. The diffuser material 129 can be attached to another plastic material to form an insert around the opening 132, 130. In other embodiments, the entire diffuser plate 120 can be made of diffuser material 129. The light blocking rib 340, 340' has an aperture 342, 342' therein. The one end of the aperture 342 can be seen at a position near the LED 312 while the other end of an aperture 342' is seen near opening 130. The apertures 342, 342' have diffuser material 129 therein. The diffuser material in the apertures 342, 342' is the same as the diffuser material near the openings 130, 132 in the diffuser plate 120. Again, the light control apparatus 300 is symmetrical and the light blocking ribs 340, 340' are also symmetrical.

Figure 5:
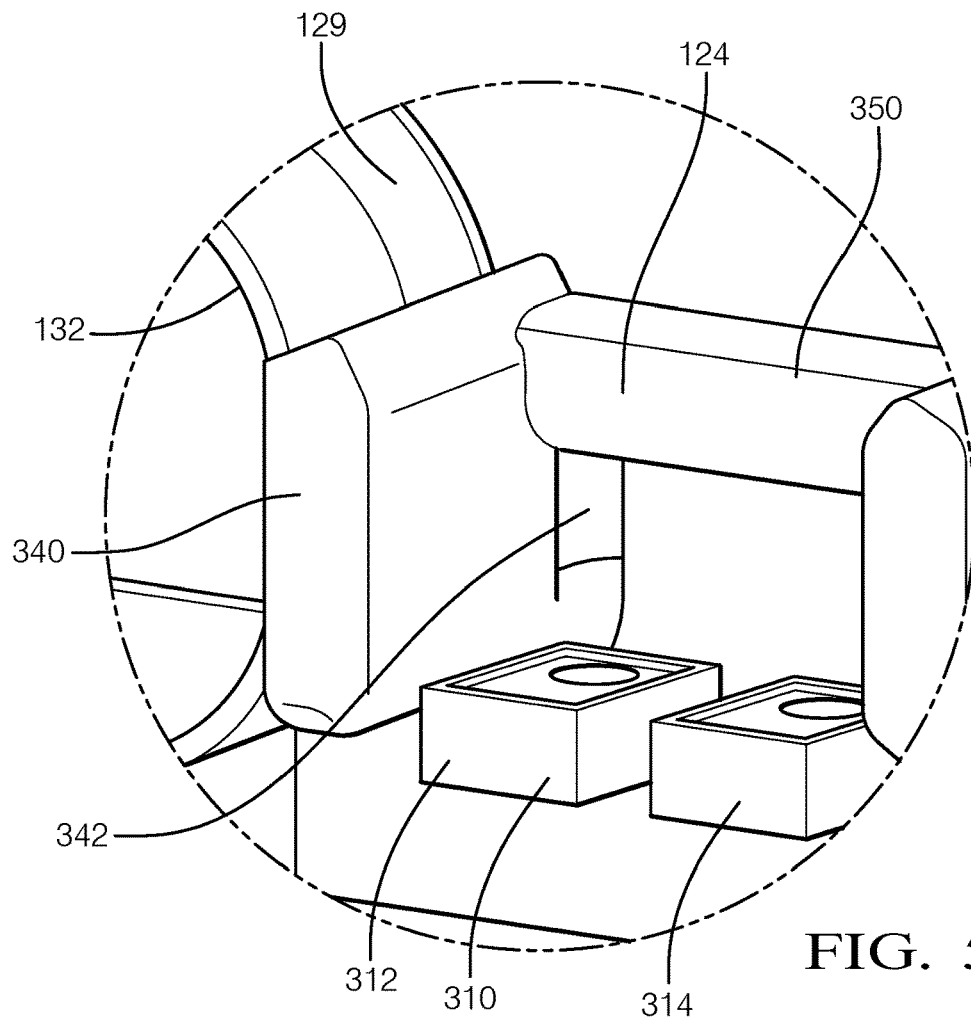
FIG. 5 is magnified isometric view of the light tunnel or aperture formed within the light blocker according to some embodiments.

FIG. 5 is a magnified isometric view of the light aperture 342 formed within the light blocking rib or light blocker 340, according to some embodiments. Again, the light pipe has been removed from FIG. 5 so that the aperture 342 can be seen more clearly. The aperture 342 has diffuser material 129 therein. As shown, the diffuser material 129 substantially fills the volume of the aperture 342. In some embodiments, the diffuser material 129 can start a distance from the opening or entrance of the aperture 342.

Now looking briefly at both FIGS. 4 and 5, the light blocking ribs 340, 340' are connected by a connecting rib 350 and a connecting rib 352 to form a rectangular box structure. The LEDs 312, 314 are connected to connecting rib 352. Of course, the LEDs 312, 314 are provided with electrical power (connectors and wiring not shown) so they generate light in a direction toward the first and second light inputs 322, 324 (shown in FIG. 3) of the light pipe 320 and in the direction of the connecting rib 350.

Figure 6:
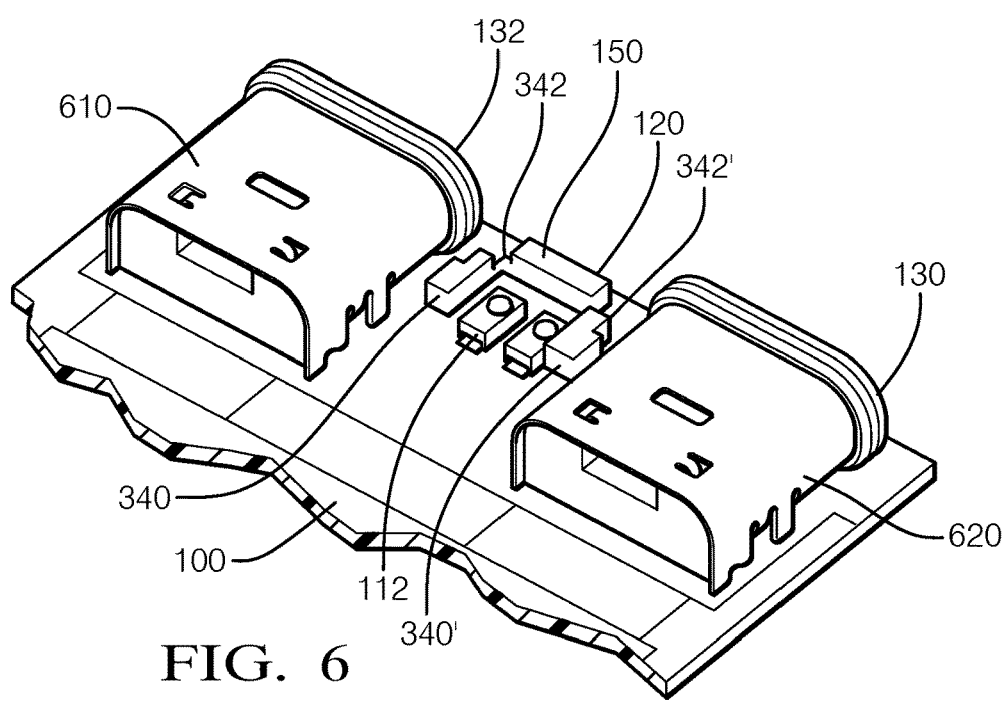
FIG. 6 is a rear, isometric cutaway view of the dashboard component with a top portion cutaway to illustrate the diffuser material located within the light tunnel or aperture in the light blocker, according to some embodiments.

FIG. 6 is a backside, isometric view of the dashboard component with a top portion of the light blocking ribs 340, 340' cutaway to illustrate the diffuser material 129 located within the light aperture 342, 342', according to some embodiments. As shown, the top portion of the housing 100 is also cut away. FIG. 6 shows that the diffuser material 129 substantially fills the entire volume of the apertures 342, 342' in the light blocking ribs 340. 340'. Also shown in FIG. 6 are the housings for the electrical components 610, 620. In this particular embodiment, these are housings for USB connectors and more specifically USB-C connectors which are positioned to receive a male portion of a USB-C connector through the openings 130, 132 in the diffuser plate 120. It is contemplated that this invention is equally applicable with other types of connectors or other types of electrical devices.

Figure 7:
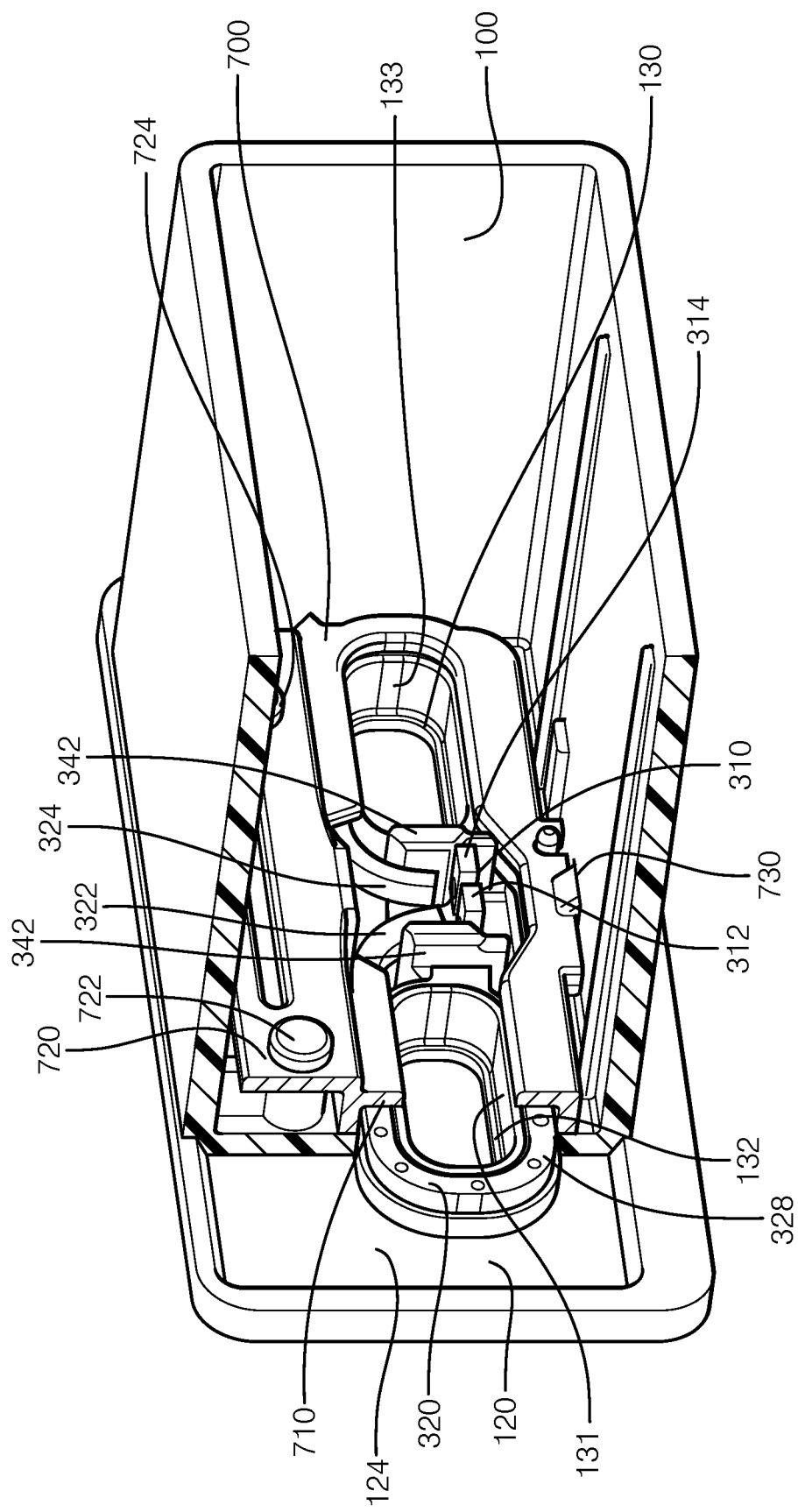
FIG. 7 is a rear, isometric cutaway view of the light control apparatus and housing with a portion of the reflector cut-away to illustrate the position of the light pipe, and other components, according to some embodiments.

FIG. 7 is a rear, isometric cutaway view of the light control apparatus 300 and housing 100 with a portion of the reflector 700 cut-away to illustrate the position of the light pipe 320, and other components, according to some embodiments. Associated with the housing 100 is the diffuser plate 120 that includes openings 130, 132 therein. The light pipe 320 includes first and second light inputs 322, 324 which are positioned near LEDs 312, 314 which are among the components of the light source 310. The light pipe 320 is positioned on the second surface or side 124 of the diffuser plate 120 near the edge of the openings 130, 132. The light pipe is positioned behind the halos 140, 142 (shown in FIG. 1) on the first side or surface 122 of the diffuser plate 120. The reflector 700 includes a reflective surface 710 which is positioned near the facets 328 of the light pipe 320. The reflective surface 710 of the reflector reflects light from the facets 328 of the light pipe 320 toward the diffuser material 129 near the openings 130, 132 in the diffuser plate 120. The reflective surface 710 substantially covers the portions of the light pipe 320 which are near the openings 130, 132 in the diffuser plate 120. The reflector 700 reflects light from the facets 328 in the light pipe 320. The reflector 700 also disperses the light from the facets 328 so that the light is spread or dispersed more evenly when it contacts the diffuser material 129 in the diffuser plate 120 near the openings 130, 132 in the diffuser plate 120. The result is a substantially even distribution of light from the light pipe 320 around the openings 130, 132. The reflected light from the light pipe 320 produces this even distribution of light at a first portion of the opening 130 and at a first portion of the opening 132.

Figure 8:
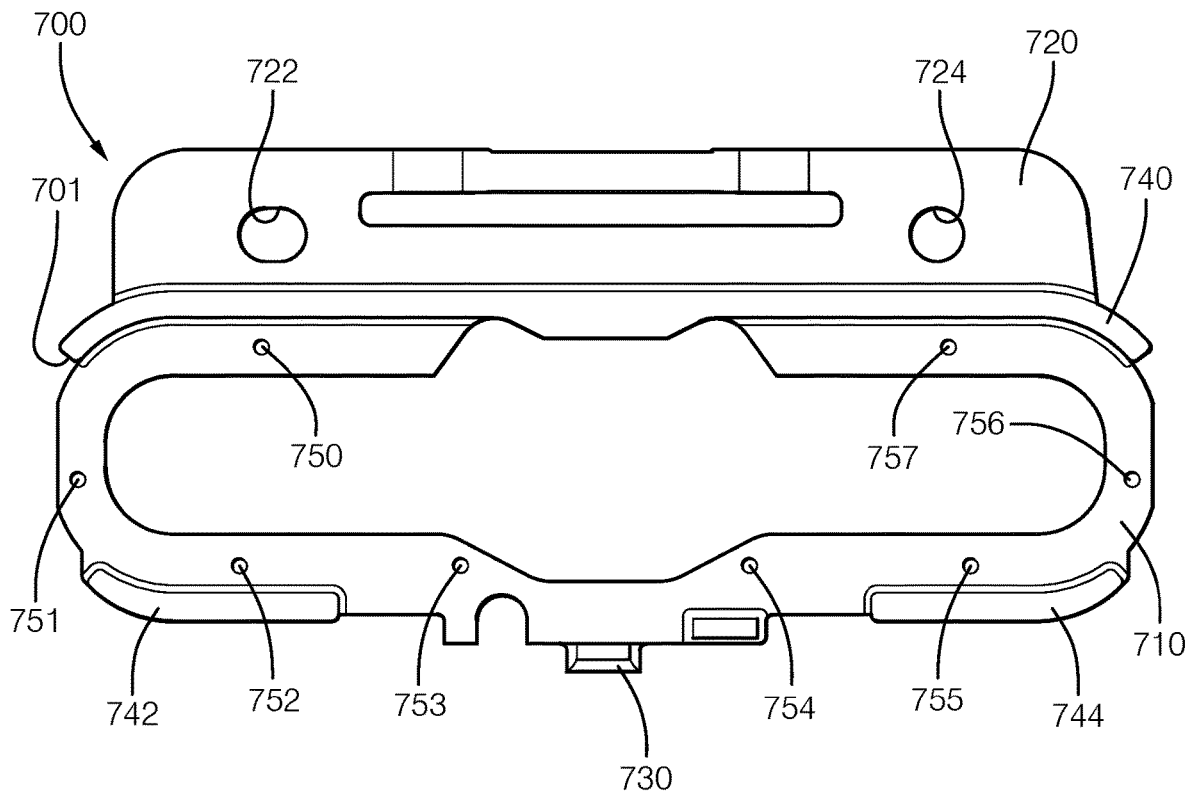
FIG. 8 is a rear view of a reflector, according to some embodiments.

FIG. 8 is a front view of a reflector 700, according to some embodiments. Further aspects of the reflector 700 will now be discussed with respect to FIGS. 7 and 8. The reflective surface 710 of the reflector 700 is shown in full. This reflective surface abuts the light pipe 320, as shown in FIG. 7. The reflective surface 710 is attached to a frame 701. Attached to the frame is an attachment beam 720 which includes attachment openings 722, 724 therein for receiving fasteners to fasten the reflector 700 to the housing 100. The reflector also includes a locating tab 730 which fits into a notch in the housing. Additionally, the reflector 700 includes an elongated standoff 740, and two short standoffs 742, 744. The standoffs 740, 742, 744 have substantially the same depth and are used to space the reflective surface 710 of the reflector 700 with respect to the light pipe 320 and with respect to the diffuser plate 120. The reflective surface 710 is generally uniform in color. The reflective surface can be painted or otherwise treated to change the color of the light from the light pipe 320 before it is directed to the diffuser plate 120. The distance between the reflective surface 710 and the light pipe 320 is controlled to control the direction and dispersion of the reflected light. The standoffs 740, 742, 744 contact the housing 100 in some embodiments. In other embodiments, the standoffs contact the diffuser plate 120. The reflective surface 710 also include pinhead spacers 750, 751, 752, 753, 754, 755, 756, 757 which space the reflective surface 710 of the reflector 700 with respect to the faceted surface of the light pipe 320. The spacers 750, 751, 752, 753, 754, 755, 756, 757 have an end attached to the reflective surface and a free end which contacts the light pipe 320. The spacers 750, 751, 752, 753, 754, 755, 756, 757 do not align with the facets 328 of the light pipe 320.

Figure 9:
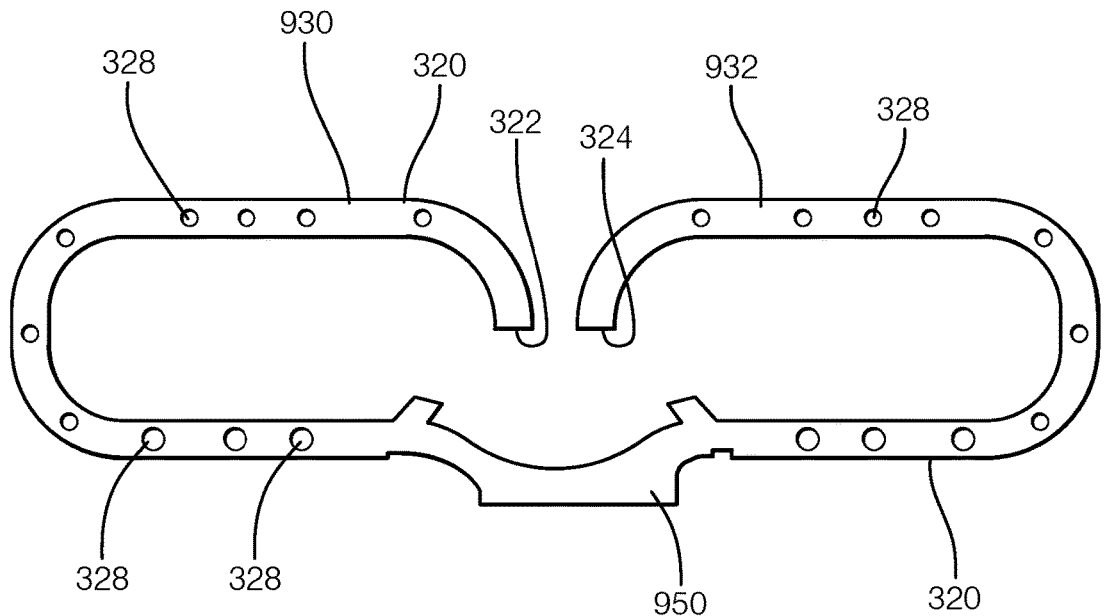
FIG. 9 is a rear view of the light pipe according to some embodiments.

FIG. 9 is a rear view of the light pipe 320 according to some embodiments. As mentioned previously, the light pipe 320 includes the first light input 322 and the second light input 324. These inputs are positioned near the light source, which in this case is LED 112 near the first light input 322, and LED 114 near the second light input 324. The light pipe 320 includes a first arm 930 and a second arm 932. The first and second light inputs 322 and 324 are the free end of the arms 930 and 932, respectively. The first arm 922 wraps around the opening 130 in the diffuser plate 120, and the second arm 932 wraps around the opening 132 in the diffuser plate 120. Light travels along the length of each of the arms 930, 932 to a bridge 950. The light in the arms 930, 932 is substantially dissipated over the length of the respective arm 930, 932. The arm 930 wraps around a first portion of the opening 130 in the diffuser plate 120, and the arm 932 wraps around a first portion of the opening 132 in the diffuser plate 120. The light pipe 920 does not deliver light the second portion of each of the openings 130, 132 in the diffuser plate 120. As mentioned above, apertures 342 and 342' in the respective light blockers 340, 340' deliver light to the second portion of each of the openings 130, 132. The apertures include diffuser material 129.

Figure 10:
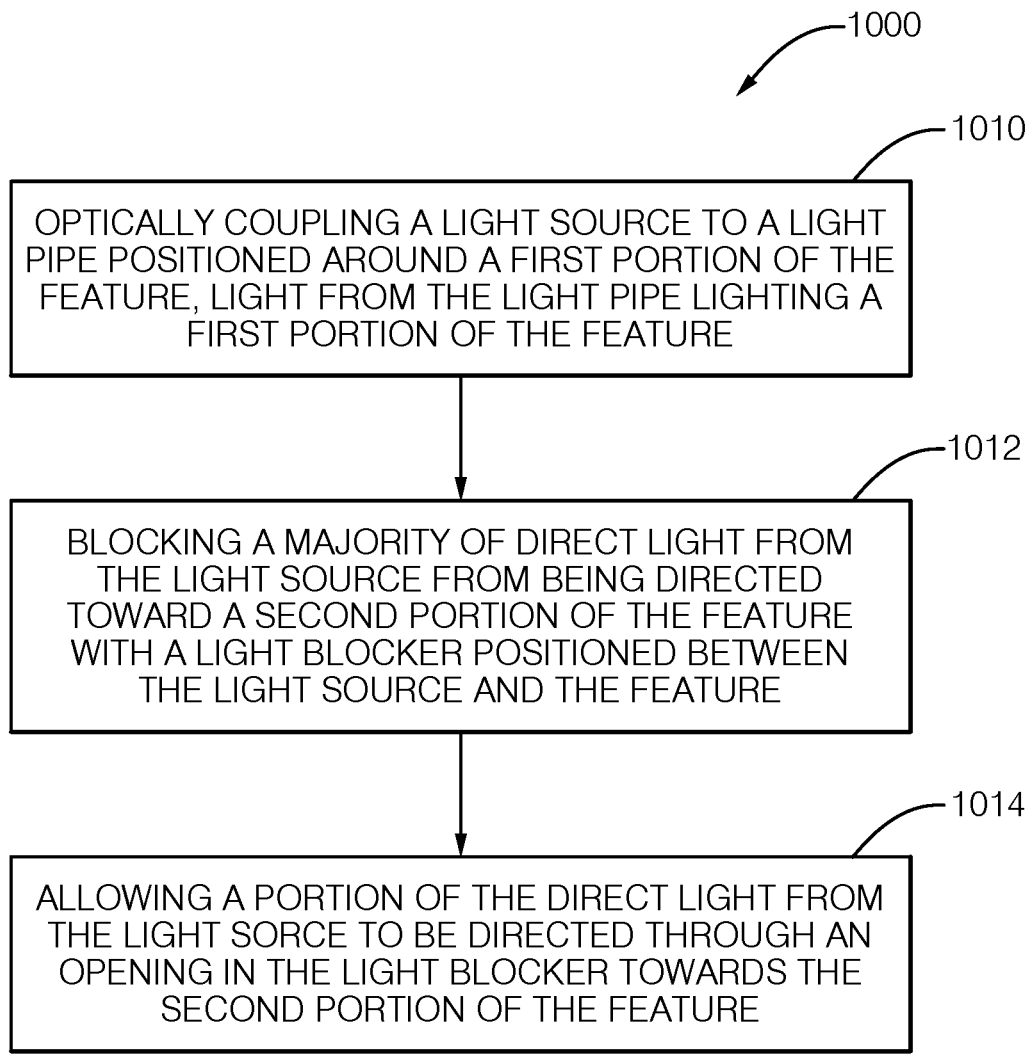
FIG. 10 is a flow chart of a method of illuminating the feature surrounding the opening of the dashboard component according to some embodiments.

FIG. 10 is a flow chart of a method 1000 of illuminating the feature surrounding the opening of the dashboard component according to some embodiments. The method 1000 includes optically coupling a light source to a light pipe positioned around a first portion of the feature 1010. Light from the light pipe lights a first portion of the feature. The method 1000 also includes blocking a majority of direct light from the light source from being directed toward a second portion of the feature 1012. A light block is positioned between the light source and the feature to block most of the light. The method 1000 also includes allowing a portion of the direct light from the light source to be directed through an aperture in the light block towards the second portion of the feature 1014. If there are multiple features a light block may be associated with each feature. The size of the aperture is varied to vary the brightness of the feature receiving light through the aperture. When the light source monochromatic, the light passing through the light tube will be the same color as the light passing through the aperture. In some embodiments, it is necessary to adjust the brightness at the second portion to make it substantially as bright as the first portion of the feature. Typically, the size of the aperture can be changed to change the brightness so that the brightness at the first portion of the feature and the second portion of the feature are substantially equal.

Figure 11:
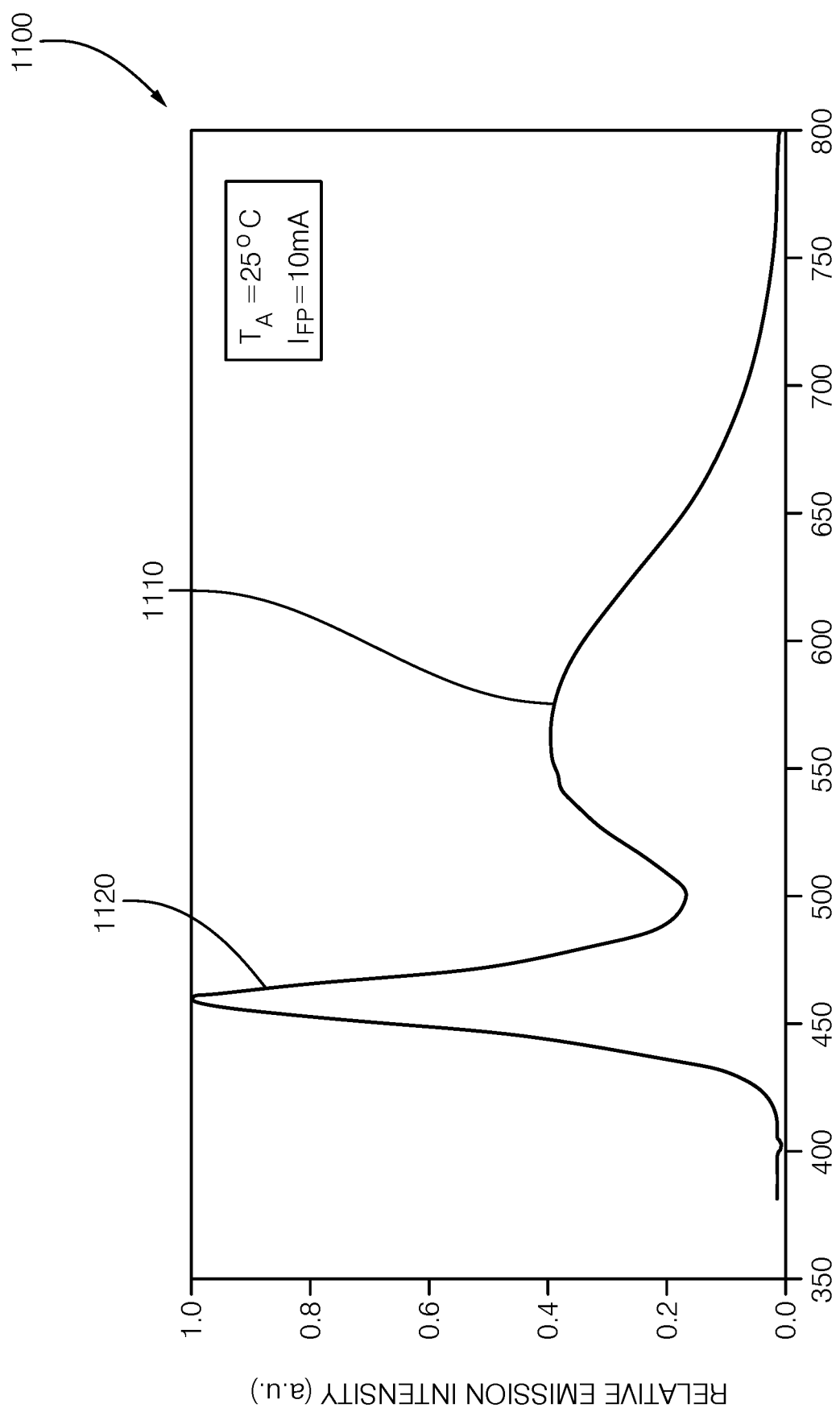
FIG. 11 is a graph of emission intensity (y axis) versus the wavelength of the light (x axis) of a multichromatic light source.

When the light source is multichromatic the light source includes two different colors of light. An example of such a multichromatic light source is shown in FIG. 11. FIG. 11 shows a graph of emission intensity (y axis) versus the wavelength of the light (x axis). As can be seen, there are two peaks of light that have different intensity levels. The graph in FIG. 11 is for a phosphor-converted white LED. This LED has a spectrum with a blue peak 1110 and a yellow peak 1120. When light from a multichromatic light source, such as the phosphor-converted white LED, is passed through a light pipe it emits light of a first color. The light passing through an aperture in a light blocker may have a different color. Additional steps can be added to the above method to balance the colors so that they appear to be the same color to the human eye. The color at the second portion of the feature can be measured using an International Commission on Illumination (known by its French acronym CIE) chromaticity diagram and can be compared to the color of light at the first portion of the feature. If the colors are different, the measurements will be at different areas of the CIE 1931 chromaticity diagram. To modify the color of the light at the first portion of a feature, the reflector 700 can be treated to change the x-y values of the color of the light to a light having a color which is closer to the light x-y values measured at the second portion of the feature. One way to treat the reflector is to paint (or use different plastic color) the reflective surface to change the color of the light entering the diffusion plate near the second feature. Another method to make the colors closer is to change or modify the light source. In some instances, it may be necessary to do both of the above in order to bring the observed color of the light from the first portion closer to the observed light color from the second portion of a feature.

The objective is to make the colors match with respect to what a human can see. The light at the first portion of a feature can be measured again and compared to the light at the second feature. Both can be placed on a CIE chromaticity diagram 1200. When measurements from the two light sources are grouped somewhat close together on the CIE 1931 chart, generally the color difference is undetectable by the naked eye. Put, another way, the observed color of the light provided to the first portion of the feature approximately matches the observed color of the light provided to the second portion of the feature. The x-y values 1201, 1202, 1203 from a first portion of the feature are close to the x-y values 1204, 1205 from the second portion of the feature.

Figure 12:
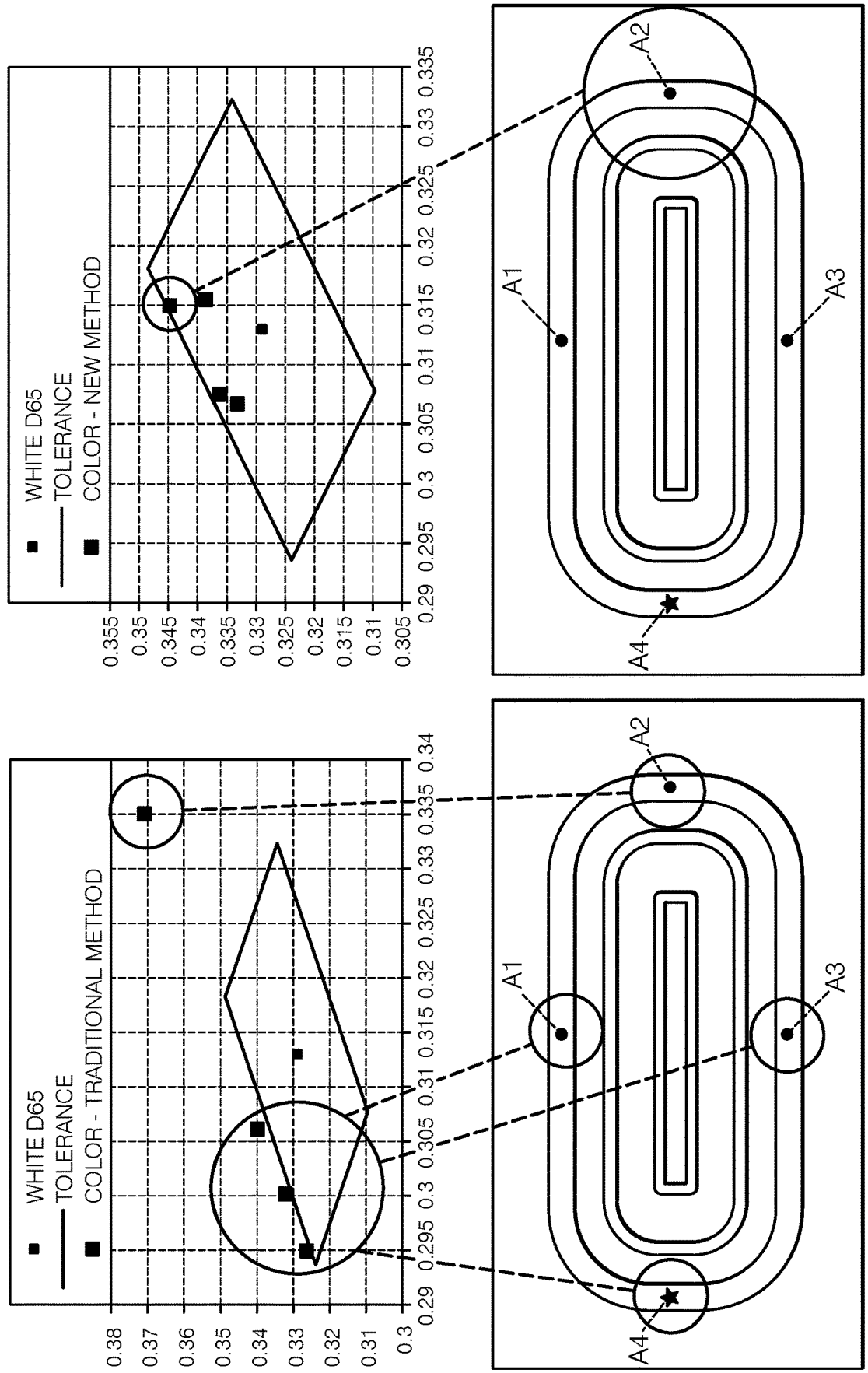
FIG. 12A is a CIE 1931 chromaticity diagram associated with providing multichromatic light at the feature surrounding the opening, as initially measured at points A1, A2, A3, and A4.
FIG. 12B is a CIE 1931 chromaticity diagram associated with providing multichromatic light at the feature surrounding the opening measured at points A1, A2, A3, and A4 after the light has been changed to be closer to matching.
FIG. 12C is a CIE 1931 chromaticity diagram associated with providing multichromatic light at the feature surrounding the opening.
Figure 12:
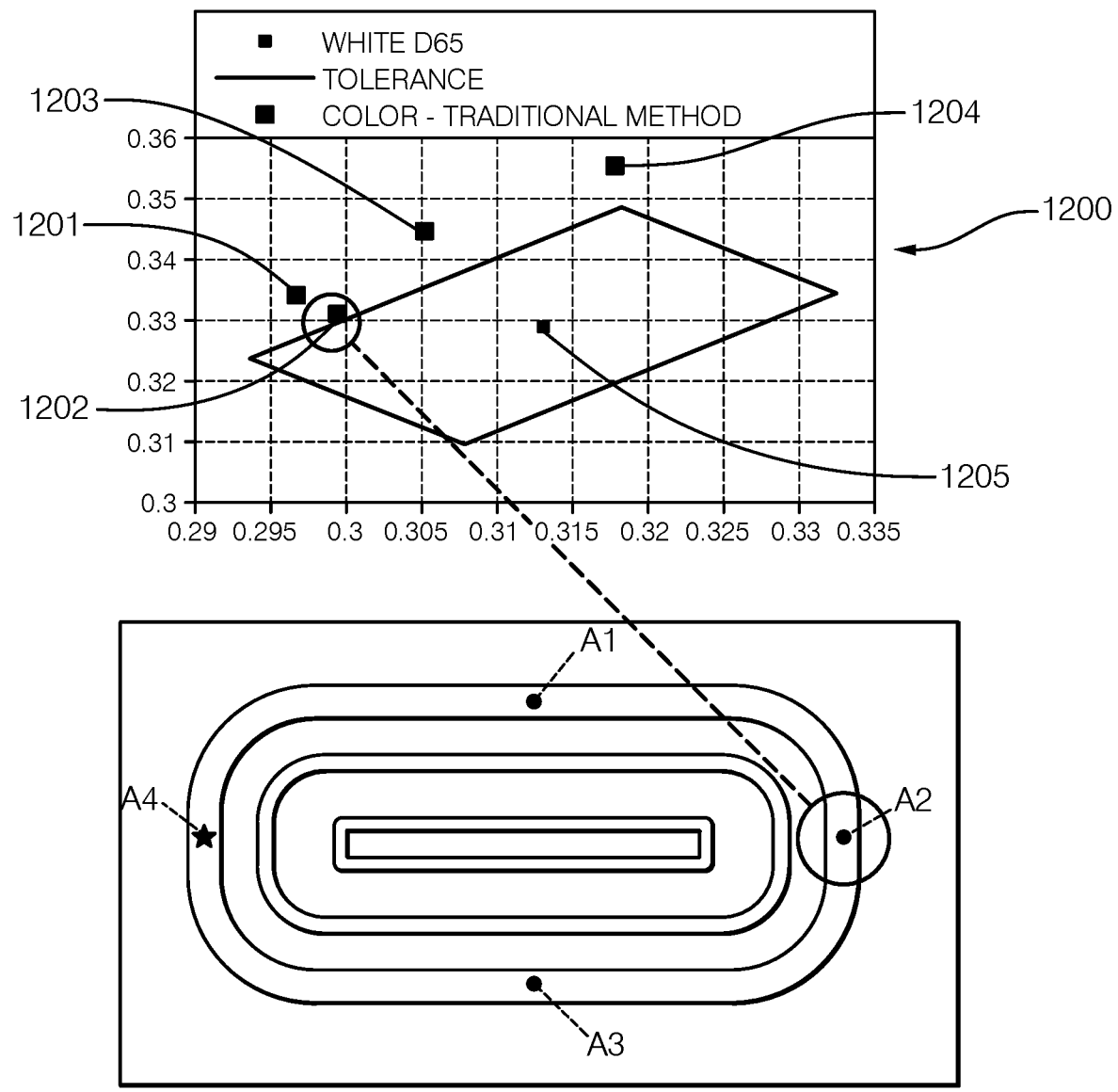

FIG. 12A is a CIE 1931 chromaticity diagram associated with providing multichromatic light at the feature surrounding the opening, as initially measured at points A1, A2, A3, and A4. In FIG. 12A, the light at the feature is measured at various points A1, A2, A3, and A4 around the feature. The chromaticity diagram related to the initial measure of the points is above the feature. As can be seen, the light at points A1, A3 and A4 are closely grouped on the chromaticity diagram as designated by the circle 1210 containing three of the measured points. The light measured at point A2, a single point within a smaller circle on the chromaticity diagram is positioned well away from the group of pints A1, A3, and A4. substantially different and well outside the group surrounded by circle 1210. The point associated with A2 is placed on the chromaticity diagram and surrounded by circle 1212. The distance between the circle 1210 and the circle 1212 is an indication of how differently the light at the point A2 is from the rest of the points.

FIG. 12B is a CIE 1931 chromaticity diagram associated with providing multichromatic light at the feature surrounding the opening measured at points A1, A2, A3, and A4 after the light has been changed to make the points A1, A2, A3, and A4 map out to be closer on the chromaticity diagram. The dots corresponding to the light measured at points A1, A2, A3, and A4 are now more closely positioned but are not forming a tight group. Consequently, there may be some difference in the color of the light as detected by a human.

FIG. 12C is a CIE 1931 chromaticity diagram associated with providing multichromatic light at the feature surrounding the opening. As can be seen, the measures of the light at the first portion of the feature (points A1, A2 and A3, and the light at the second portion of the feature, depicted by point A2, are grouped near one another. This indicates that the color match is sufficiently close so as not to be discernable to the user of an instrument panel which includes the light control apparatus 300. The x-y values 1201, 1202, 1203 from a first portion of the feature are close to the x-y values 1204, 1205 from the second portion of the feature.

DISCUSSION OF POSSIBLE EMBODIMENTS

The following are non-exclusive descriptions of possible embodiments of the present invention.

According to one aspect, a light control apparatus includes a diffuser plate, a light source, a light pipe, and a light blocker. The diffuser plate having at least one opening therein. The diffuser plate also includes a first surface having an opaque coating and second surface. The first surface also includes a feature around the opening in the diffuser plate that exposes a portion of the diffuser plate. In other words, the opaque material is removed at the feature around the opening in the diffuser plate. The light source positioned proximate the second surface of the diffuser plate. The light pipe is optically coupled to the light source. The light pipe is positioned around a portion of the opening near the second surface of diffuser plate. The light pipe delivers light to the diffuser plate around a first portion of the at least one feature. The light blocker is positioned near a second portion of the at least one feature. The light blocker is positioned between the light source and the second portion of the feature, the light blocker having an opening therein to allow light to pass from the light source to the diffuser plate proximate the second portion of the feature, the opening being smaller than the light blocker.

The method of the preceding paragraph can optionally include, additionally and/or alternatively any, one or more of the following features, configurations and/or additional components.

The aperture in the light blocker may be varied in size to control the amount of light delivered to the second portion of the diffuser plate.

The light source may be a light emitting diode.

The light the light source can produce monochromatic light.

The light control apparatus may also include a reflector. For example, the light pipe may be positioned between the diffuser plate and the reflector.

The light source may also produce multichromatic light.

The light passing through the at least one aperture in the light blocker has a first light characteristic, and the light emitted by the light pipe may have a second characteristic. The reflector may be treated so that the characteristic of the light from the light pipe as reflected by the reflector is changed substantially to the first light characteristic when directed to and passing through the diffuser plate.

The light characteristic may be a CIE value.

The light characteristic of the light passing through the light pipe and the diffuser plate has a first CIE value visible at the first portion of the feature, and the light passing through the aperture in the light blocker produces a second CIE value at a second portion of the feature. The first CIE value and the second CIE value appear substantially equal at the feature surrounding the opening on the front surface of the diffuser plate.

The light control apparatus may also include a housing. The diffuser plate, the light pipe, the light block and the light source may be attached to the housing. The first surface is located at an exterior position with respect to the housing. The light pipe, light blocker and light source may be located near the second surface of the diffuser plate on the interior of the housing.

Diffuser material may be positioned within the aperture of the light blocker.

A method of lighting a feature associated with a diffuser plate includes optically coupling a light source to a light pipe positioned around a first portion of the feature, blocking a majority of direct light from the light source from being directed toward a second portion of the feature with a light block positioned between the light source and the feature, and allowing a portion of the direct light from the light source to be directed through an opening in the light block towards the second portion of the feature. Light from the light pipe lights a first portion of the feature.

The method of the preceding paragraph can optionally include, additionally and/or alternatively any, one or more of the following features, configurations and/or additional components.

In one example, the light source is monochromatic.

In other examples, the size of the aperture in the light block may be varied to vary the brightness of the light at the second portion of the feature.

In yet another example, the light source is multichromatic. The method in this example may include modifying a color of the light delivered to the first portion of the feature by the light pipe by reflecting the light from the light pipe off a colored reflector. The color of the colored reflector is selected based on a color of the light provided through the opening in the light block toward the second portion of the feature.

The color of the light provided to the first portion of the feature approximately matches the color of the light provided to the second portion of the feature.

In another example, changing the light produced at the light source may adjust the light color at the first portion of the feature and the second portion of the feature.

In another example, a diffuser material is within the aperture in the light block. Thus, the light passing through the aperture

The invention claimed is:

1. A light control apparatus comprising:
    a diffuser plate having an opening therein further comprising:
        a first surface having an opaque coating and a feature around the opening that exposes a portion of the diffuser plate; and
        a second surface;
    a light source positioned proximate the second surface of the diffuser plate;
    a light pipe optically coupled to the light source, the light pipe positioned around a portion of the opening near the second surface of diffuser plate, the light pipe delivering light to the diffuser plate around a first portion of the feature;
    a light blocker positioned near a second portion of the feature, the light blocker positioned between the light source and the second portion of the feature, the light blocker having an aperture therein to allow light to pass from the light source to the diffuser plate proximate the second portion of the feature, the opening being smaller than the light blocker.

2. The light control apparatus of claim 1, wherein size of the aperture in the light blocker is varied to control the amount of light delivered to the second portion of the diffuser plate.

3. The light control apparatus of claim 1, wherein the light source is a light emitting diode.

4. The light control apparatus of claim 1, wherein the light source is a monochromatic.

5. The light control apparatus of claim 1, further comprising a reflector, the light pipe positioned between the diffuser plate and the reflector.

6. The light control apparatus of claim 5, wherein the light passing through the aperture in the light blocker has a first light characteristic, the light emitted by the light pipe has a second characteristic, and the reflector is treated so that reflected light from the reflector is changed substantially to the first light characteristic when directed to and passing through the diffuser plate.

7. The light control apparatus of claim 6, wherein the first light characteristic and the second light characteristic have a CIE x-y value.

8. The light control apparatus of claim 7, wherein the light passing through the light pipe and the diffuser plate has a first CIE x-y value and is visible at the first portion of the feature and the light passing through the opening in the light blocker has a second CIE x-y value at a second portion of the feature, a color of the light appearing substantially equal at the feature surrounding the opening on the front surface of the diffuser plate.

9. The light control apparatus of claim 1, further comprising a housing, the diffuser plate, the light pipe, the light blocker and the light source attached to the housing, the first surface located at an exterior position with respect to the housing and the light pipe, the light blocker and the light source located near the second surface of the diffuser plate on the interior of the housing.

10. The light control apparatus of claim 1, further comprising diffuser material positioned within the aperture of the light blocker.

* * * * *